United States Patent
Mitchell et al.

(10) Patent No.: US 6,227,295 B1
(45) Date of Patent: May 8, 2001

(54) HIGH TEMPERATURE HYDRAULIC FRACTURING FLUID

(75) Inventors: Thomas O. Mitchell, Sugar Land; Michael D. Parris, Richmond, both of TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/415,400

(22) Filed: Oct. 8, 1999

(51) Int. Cl.$^7$ ........................................ E21B 43/26
(52) U.S. Cl. ..................... 166/300; 166/308; 507/246; 507/248; 507/251; 507/271; 507/903; 507/922
(58) Field of Search .................. 166/300, 308; 507/211, 213, 215, 216, 217, 246, 248, 250, 251, 271, 273, 903, 922

(56) References Cited

U.S. PATENT DOCUMENTS

| | | |
|---|---|---|
| 4,486,317 | 12/1984 | Sandell . |
| 4,486,340 | * 12/1984 | Glass, Jr. ........................ 507/248 X |
| 4,534,870 | 8/1985 | Williams . |
| 4,599,180 | 7/1986 | Vio et al. . |
| 4,686,052 | 8/1987 | Baranet et al. . |
| 4,702,848 | * 10/1987 | Payne ............................... 166/308 X |
| 4,721,577 | 1/1988 | Kanda et al. . |
| 4,808,739 | 2/1989 | Putzig et al. . |
| 5,217,632 | 6/1993 | Sharif . |
| 5,305,832 | 4/1994 | Gupta et al. . |
| 5,362,408 | 11/1994 | Pakulski et al. . |
| 5,614,475 | * 3/1997 | Moorhouse et al. ............ 166/308 X |
| 5,798,320 | * 8/1998 | Dawson et al. ..................... 507/271 |
| 5,964,295 | * 10/1999 | Brown et al. ....................... 166/308 |

OTHER PUBLICATIONS

Yaritz, Joseph et al, "Development of A Dual Crosslinker Fracturing Fluid System", SPE 38959, Society of Petroleum Engineers Inc., 1997.

Harry, David N. et al., "Rheological Responses to Variations in Aqueous–Based Zirconium Crosslinker Chemistry", SPE 37280, Society of Petroleum Engineers Inc., 1997.

Walker, Michael L. et al., "Effects of Oxygen on Fracturing Fluids", SPE 28978, Society of Petroleum Engineers Inc., 1995.

\* cited by examiner

Primary Examiner—George Suchfield
(74) Attorney, Agent, or Firm—Robin C. Nava; Thomas Mitchell; John J. Ryberg

(57) ABSTRACT

A fluid that is useful in stimulation operations, and in particular, in hydraulic fracturing treatments, comprises a carrier fluid; a solvatable, crosslinkable polymer; a cross-linking agent that does not cause substantial cross-linking of the polymer at temperatures less than about 105° F. and a pH of about 10 or greater; and an organic amine stabilizing agent that has a first $pK_a$ or a pH in water of at least about 9.5. One group of such amines has the formula $$H_2N-(R_1NH)_n-H$$

where $R_1$ is $C_1-C_4$ alkyl and n is from 1–6. In one embodiment, the cross-linking agent is an organic zirconate, such as bis(hydroxyethyl)glycine zirconate. The organic zirconate is effective to cross-link the polymer when the composition is at a temperature of at least about 105° F., and a pH of about 10 or higher, preferably a pH in the range of about 10.5–12.

17 Claims, 4 Drawing Sheets

HIGH TEMPERATURE HYDRAULIC FRACTURING FLUID

TECHNICAL FIELD OF THE INVENTION

This Invention relates to the stimulation of hydrocarbon wells and in particular to fluids and methods for hydraulic fracturing of a subterranean formation.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. This provides a partial flowpath for the oil to reach the surface. In order for oil to be "produced," that is travel from the formation to the wellbore (and ultimately to the surface), there must be a sufficiently unimpeded flowpath from the formation to the wellbore. This flowpath is through the formation rock—e.g., sandstone, carbonates—which has pores of sufficient size, connectivity, and number to provide a conduit for the oil to move through the formation.

Hence, one of the most common reasons for a decline in oil production is "damage" to the formation that plugs the rock pores and therefore impedes the flow of oil. This damage generally arises from another fluid deliberately injected into the wellbore, for instance, drilling fluid. Even after drilling, some drilling fluid remains in the region of the formation near the wellbore, which may dehydrate and form a coating on the wellbore. The natural effect of this coating is to decrease permeability to oil moving from the formation in the direction of the wellbore.

Another reason for lower-than-expected production is that the formation is naturally "tight" (low permeability formation), that is, the pores are sufficiently small that the oil migrates toward the wellbore only very slowly. The common denominator in both cases (damage and naturally tight reservoirs) is low permeability.

Techniques performed by hydrocarbon producers to increase the net permeability of the reservoir are referred to as "stimulation." Essentially, one can perform a stimulation technique by: (1) injecting chemicals into the wellbore to react with and dissolve the damage (e.g., wellbore coating); (2) injecting chemicals through the wellbore and into the formation to react with and dissolve small portions of the formation to create alternative flowpaths for the hydrocarbon (thus rather than removing the damage, redirecting the migrating oil around or through the damage); or (3) injecting chemicals through the wellbore and into the formation at pressures sufficient to actually fracture the formation, thereby creating a large flow channel though which hydrocarbon can more readily move from the formation and into the wellbore. The present invention is directed primarily to the third of these processes.

Hydraulic fracturing involves literally breaking or fracturing a portion of the surrounding strata, by injecting a specialized fluid into the wellbore directed at the face of the geologic formation at pressures sufficient to initiate and extend a fracture in the formation (i.e. above the minimum in situ rock stress). More particularly, a fluid is injected through a wellbore; the fluid exits the wellbore through holes (perforations in the well casing) and is directed against the face of the formation (sometimes wells are completed openhole where no casing and therefore no perforations exist, so the fluid is injected through the wellbore and directly to the formation face) at a pressure and flow rate sufficient to overcome the minimum in situ stress (also known as minimum principal stress) to initiate and/or extend a fracture(s) into the formation. Actually, what is created by this process is not always a single fracture, but a fracture zone, i.e., a zone having multiple fractures, or cracks in the formation, through which hydrocarbon can more easily flow to the wellbore.

Generally speaking, creating a fracture in a hydrocarbon-bearing formation requires a complex suite of materials. In the case of conventional fracturing treatments, four or five principal components are required: (1) a carrier fluid (usually water or brine), (2) a polymer, (3) a cross-linker, (4) a proppant, and (5) optionally a breaker. (Numerous other components are sometimes added, e.g. fluid loss agents, whose purpose is to control leak-off, or migration of the fluid into the fracture face.) Roughly, the purpose of these fluids is to first create/extend the fracture, then once it is opened sufficiently, to deliver proppant into the fracture, which keeps the fracture from closing once the pumping operation is completed. The carrier fluid is simply the means by which the proppant and breaker are carried into the formation. Thus, the fracturing fluid is typically prepared by blending a polymeric gelling agent with an aqueous solution (sometimes oil-based, sometimes a multi-phase fluid is desirable); often, the polymeric gelling agent is a solvatable polysaccharide, e.g., galactomannan gums, glycomannan gums, and cellulose derivatives. The purpose of the solvatable (or hydratable) polysaccharides is: (1) to provide viscosity to the fluid so that it can create/extend the fracture; and (2) to thicken the aqueous solution so that solid particles known as "proppant" (discussed below) can be suspended in the solution for delivery into the fracture. Again, the purpose of the proppant is to literally hold open or prop open the fracture after it has been created. Thus the polysaccharides function as viscosifiers, that is, they increase the viscosity of the aqueous solution by 10 to 100 times, or even more. In many fracturing treatments, a cross-linking agent is added which further increases the viscosity of the solution by cross-linking the polymer. The borate ion has been used extensively as a crosslinking agent for hydrated guar gums and other galactomannans to form aqueous gels, e.g., U.S. Pat. No. 3,059,909. Other suitable cross-linking agents include titanium (U.S. Pat. No. 3,888,312), chromium, iron, aluminum and zirconium (U.S. Pat. No. 3,301,723) compounds.

The purpose of the proppant is to keep the newly fractured formation in that fractured state, i.e., from re-closing after the fracturing process is completed; thus, it is designed to keep the fracture open—in other words to provide a permeable path (along the fracture) for the hydrocarbon to flow through the fracture and into the wellbore. More specifically, the proppant provides channels within the fracture through which the hydrocarbon can flow into the wellbore and therefore be withdrawn or "produced." Typical materials from which the proppant is made include sand (e.g. 20–40 mesh), bauxite, man-made intermediate-strength or high strength materials and glass beads. The proppant can also be coated with resin, which causes the resin particles to stick to one another, to help prevent proppant flowback in certain applications. Thus, the purpose of the fracturing fluid generally is two-fold: (1) to create or extend an existing fracture through high-pressure introduction into the geologic formation of interest; and (2) to simultaneously deliver the proppant into the fracture void space so that the proppant can create a permanent channel through which the hydrocarbon can flow to the wellbore.

One problem in fracturing operations is that the polymers often degrade before the operation is completed, as a result of thermal, oxidative/free radical, or acid hydrolysis reactions. This degradation causes the viscosity of the fracturing fluid to decrease correspondingly. Reduction in viscosity can reduce the fluid's effectiveness in creating fractures and delivering proppant to the desired sites. Two approaches have been used in an attempt to maintain the desired minimum viscosity in the fracturing fluid during the fracturing operation. One is to increase the initial loading of the polymer in the fluid, thus increasing the fluid's initial viscosity. However, this approach increases the energy required to pump the fluid into and through the wellbore. This and the cost of the additional polymer increases the overall cost of the fracturing operation, and also can lower well performance due to reduced conductivity in the proppant pack.

A second approach is to include a stabilizer in the fracturing fluid, to minimize polymer degradation. Commonly used stabilizers include methanol and sodium thiosulfate ($Na_2S_2O_3$). Although the mechanism of action of these stabilizers is not fully understood, it is believed that they act as oxygen scavengers, and thus prevent polymer degradation that would otherwise be caused by oxygen dissolved in the fracturing fluid. However, methanol is flammable and therefore is generally avoided. A substantial quantity of sodium thiosulfate is required when it is used as a stabilizer. Neither of these two compounds is sufficiently effective as a stabilizer.

The problem of polymer degradation is becoming even more important recently because of the increasing incidence of very deep, hot (e.g., temperature >250° F.) wells. Therefore, there is a need for improved fracturing fluids that are suitable for use at high temperatures.

SUMMARY OF THE INVENTION

The present invention relates to the use of fluids in hydraulic fracturing operations. One embodiment of the invention is a well treatment fluid composition that comprises a carrier fluid; a solvatable, crosslinkable polymer; a cross-inking agent that does not cause substantial cross-linking of the polymer at ambient temperature (less than about 105° F.) and a pH of about 10 or greater; and an organic amine stabilizing agent that has a first $pK_a$ or a pH in water of at least about 9.5.

"Substantial cross-linking" in this context is indicated by a viscosity increase of at least about 300% over the base fluid viscosity. In other words, when a cross-linker of the present invention is combined with the polymer, the viscosity of the composition should increase by less than about 300% as long as the composition remains below about 105° F. Substantial cross-linking will occur at a pH of at least about 10 when the composition is heated to about 105° F. or higher. In one embodiment of the invention, the cross-linking agent is an organic zirconate. Most preferably, the organic zirconate cross-linking agent is effective to cross-link the polymer at a pH in the range of about 10.5–12 and a temperature of at least about 105° F. One particularly preferred cross-linking agent comprises bis(hydroxyethyl) glycine zirconate.

In one embodiment, the organic amine stabilizer has the formula $H_2N-(R_1NH)n-H$ where $R_1$ is $C_1-C_4$ alkyl and n is from 1–6. Preferably $R_1$ is ethylene and n is 4. Tetraethylenepentamine (TEPA) is a particularly preferred stabilizer.

The composition can optionally further comprise a proppant, a delay agent (such as a bicarbonate salt), a viscosity breaker agent, or one or more other additives, such as scale inhibitors, surfactants, biocides, and breaker aids.

In one specific embodiment of the present invention, the well treatment fluid composition comprises a carrier fluid; a solvatable, crosslinkable polymer selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, xanthan, and mixtures thereof; a cross-linking agent that comprises bis(hydroxyethyl)glycine zirconate; an organic amine stabilizing agent that comprises tetraethylenepentamine; and a delay agent that comprises a bicarbonate salt.

Another aspect of the present invention is a method of hydraulically fracturing a subterranean formation. The method includes the step of injecting a well treatment fluid composition via a wellbore into a subterranean formation at a flow rate and pressure sufficient to produce or extend a fracture in the formation. The well treatment fluid composition comprises the materials described above.

The compositions and methods of the present invention provide several substantial advantages over prior fracturing fluids and methods. At ambient temperature, the fluid can quickly reach a viscosity sufficient to transport proppant (e.g., 40–120 cP), but will not crosslink further until it is heated to about 105° F. or higher. Preferably the fluid will exhibit this delay in cross-linking for at least about 10 minutes at ambient temperature. Therefore, the fluid has an initial viscosity that is high enough to carry proppant, but not so high as to make pumping the fluid difficult. When exposed to elevated formation temperature, the fluid can crosslink further, and will be less likely than prior art fluids to suffer reduction of viscosity to excessively low levels. The present invention also is relatively simple and inexpensive to manufacture.

DETAILED DESCRIPTION OF PREFERRED EMBODIMENTS

Components of the Fracturing Fluid

While the compositions of the present invention are described herein as comprising certain materials, it should be understood that the composition can optionally comprise two or more chemically different such materials. For example, a composition could comprise a mixture of two or more organic amine stabilizing agents having the characteristics described above. Likewise, two or more organic zirconate cross linkers or other components could be present in the composition.

A fracturing fluid of the present invention will comprise a carrier fluid. Water and brine are the most commonly used carrier fluids. Emulsions or other combinations of aqueous and organic fluids can also be used.

The fracturing fluid will also comprise a viscosifying polymer that is typically a solvatable polysaccharide. Suitable hydratable polymers include, for example, guar, hydroxypropyl guar, carboxymethyl guar, carboxymethylhydroxypropyl guar, hydroxyethyl cellulose, carboxymethylhydroxyethyl cellulose, hydroxypropyl cellulose, and xanthan. Other natural and synthetic polymers can be used as well.

The fluid will also comprise an organic zirconate cross-linking agent for the polymer. One particularly preferred crosslinker is bis(hydroxyethyl)glycine zirconate, available from DuPont. (See U.S. Pat. No. 4,808,739.)

Preferably the well treatment fluid also comprises a delay agent, to delay the cross-linking of the polymer. This permits the fracturing fluid to be pumped at a lower initial viscosity, while allowing the fluid viscosity to subsequently increase to the desired level after cross-linking begins. Suitable delay agents include, for example, bicarbonate salts. A particularly preferred delay agent is sodium bicarbonate.

The fluid also comprises an organic amine stabilizing agent that has a first $pK_a$ or a pH in water of at least about 9.5. The organic amine preferably has from 1–20 carbon atoms, more preferably 1–10 carbon atoms. In one particularly preferred embodiment, the organic amine has the formula:

$$H_2N\text{---}(R_1NH)_n\text{---}H$$

where $R_1$ is $C_1$–$C_4$ alkyl and n is from 1–6. Preferably $R_1$ is ethylene and n is 4. This preferred amine, tetraethylenepentamine (TEPA), is available from Dow Chemical. When TEPA is used as the stabilizer, the fluid will typically have a pH of about 10.8, which is too high for many Zr-based crosslinkers to work effectively. However, it has surprisingly been found that the use of an organic zirconate as described above allows the needed crosslinking to occur despite the relatively high pH.

Table 1 below lists a number of organic amines that can be used as stabilizers in the present invention. The $pK_a$ values in the table are from the literature; the pH values in the table were mostly determined experimentally, although some were taken from the literature.

TABLE 1

| Stabilizer | Code or Tradename | pKa | pH |
|---|---|---|---|
| tetraethylenepentamine | TEPA | | 11.29 |
| ethylenediamine | | 10.7, 7.6 | |
| diethylenetriamine | DETA | | 11.42 |
| piperazine | | | |
| N-aminoethylpiperazine | | | |
| triethylenetetramine | | | |
| pentaethylenehexamine | | | |
| higher ethylene polyamines | | | |
| 1,4-diaminobutane | | 11.2, 9.7 | |
| n-butylamine | | 10.8 | |
| n-decylamine | | 10.6 | |
| diethylamine | | 10.5 | |
| diisopropylamine | | 11 | |
| ethylamine | | 10.8 | |
| hexamethylenediamine | | 11.9 | |
| piperazine | | 9.8 | |
| 1,2-diaminopropane | | 9.8, 6.6 | |
| 1,3-diaminopropane | | 10.9, 9.0 | |
| tetramethylenediamine | | 10.7 | |
| di-(gamma-aminopropylether) of 2-methyl-1,3-propane diol | DPA-12 | | 11.41 |
| di-(gamma-aminopropylether) of ethylene glycol | NDPA-10 | | 11.58 |
| di-(gamma-aminopropylether) of 1,4-butane diol | NDPA-12 | | 11.55 |
| N,N'-bis(3-aminopropyl)ethylenediamine | BAPED | | 11.72 |

TABLE 1-continued

| Stabilizer | Code or Tradename | pKa | pH |
|---|---|---|---|
| tris-(2-aminoethyl)amine | TAA | | 11.25 |
| Alkoxylated diethylene diamine | ADD | | 10.68 |
| N-tallowalkyl-1,3-propanediamines | Duomeen T | | 9.68 |
| N,N-diethylhydroxylamine | DHA | | 11.06 |
| dodecylamine | DDA | | 10.22 |

In addition to DPA-12, NDPA-10, and NDPA-12 as listed in the above table, other similar organic amine stabilizers include other amino analogs of diols, glycols, and poly(propyleneglycol)'s (available from Tomah Products, Inc., Milton, Wis.). Duomeen T, also listed in the above table, is available from Akzo Nobel Chemicals, Inc., Chicago, Ill.

The fluid will also typically comprise a proppant. Suitable materials from which the proppant can be made include sand (e.g. 20–40 mesh), bauxite, man-made intermediate-strength or high strength materials, and glass beads. Optionally the proppant can be coated with resin of a type and in an amount that will permit consolidation of the proppant particles into a mass, for example when subjected to the elevated temperatures and pressures of the formation.

The fluid will also typically comprise a breaker. The purpose of this component is to "break" or destroy/diminish the viscosity of the fracturing fluid (the matrix carrying the proppant) so that this fluid is more easily recovered from the fracture during clean-up. Examples of breakers suitable for use in the method of the present invention include enzymes such as galactomannanase and oxidizers such as ammonium persulfate. Additionally, the breakers can be encapsulated to delay their release, for example as described in U.S. Pat. No. 4,741,401, which is incorporated herein by reference.

Optionally, the fracturing fluid can further contain one or more additives such as surfactants, breaker aids, salts (e.g., potassium chloride), anti-foam agents, scale inhibitors, and bactericides.

The proportion of the various components of a composition of the present invention will vary depending on the characteristics of the formation to be treated and other factors well known in the art. Typical concentration ranges for an exemplary composition are as follows (percentages are by weight):

| | |
|---|---|
| water | 95–99.5% |
| hydratable polymer | 0.24–0.72% |
| crosslinker | 0.05–0.15% |
| organic amine stabilizer | 0.05–0.40% |
| KCl | 1–2% |
| other additives | 0.01–0.5% each |

The components of the fracturing fluid can be combined in a mixing tank above ground and then injected into the well and the target formation. Alternatively, one or more of the components, for example the breaker, can be stored by itself and injected into the wellbore and the formation after the fluid has been injected.

The composition of the present invention provides useful stability enhancement at temperatures of 250° F. or higher. Preferably the fracturing fluid of the present invention can maintain a viscosity of at least 100 cP at 100 sec$^{-1}$ for at least 90 minutes at 375° F.

Fracturing Procedures

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. See *Stimulation Engineering Handbook*, John W. Ely, Pennwell Publishing Co., Tulsa, Okla. (1994).

The present invention can be further understood from the following examples.

EXAMPLE 1

Aqueous polymer solutions were aged in an air oven at elevated temperatures, and their viscosity was measured before and after the aging. The solutions were 50 ppt (pounds of additive per 1,000 gallons of fluid) carboxymethylhydroxypropyl guar (CMHPG) linear gels prepared from a slurry of 51% (wt.) CMHPG (available from Hercules) and 49% diesel oil. This fluid was hydrated in 2% KCl solution by adding just enough aqueous sodium acetate/acetic acid mixture (pH 5.5–6.0) to adjust the pH to 7 while blending at 2,000 RPM on a Waring blender for 15 minutes. To this was added 1 gpt (gallons of additive per 1,000 gallons of fluid) of a bactericide comprising 42.5 weight % propane-1,2-diol, 2–5 wt % sodium hydroxide, and 9 wt % 1,2-benzisothiazolin-3-one in water (referred to hereafter as "bactericide 1"). The base gels were made in 1 liter quantities, and stored in Nalgene-type plastic bottles. The viscosity of each batch of base gel was measured at 70° F. on a Contraves LS-30 viscometer to establish the baseline for that batch.

Figure 1:
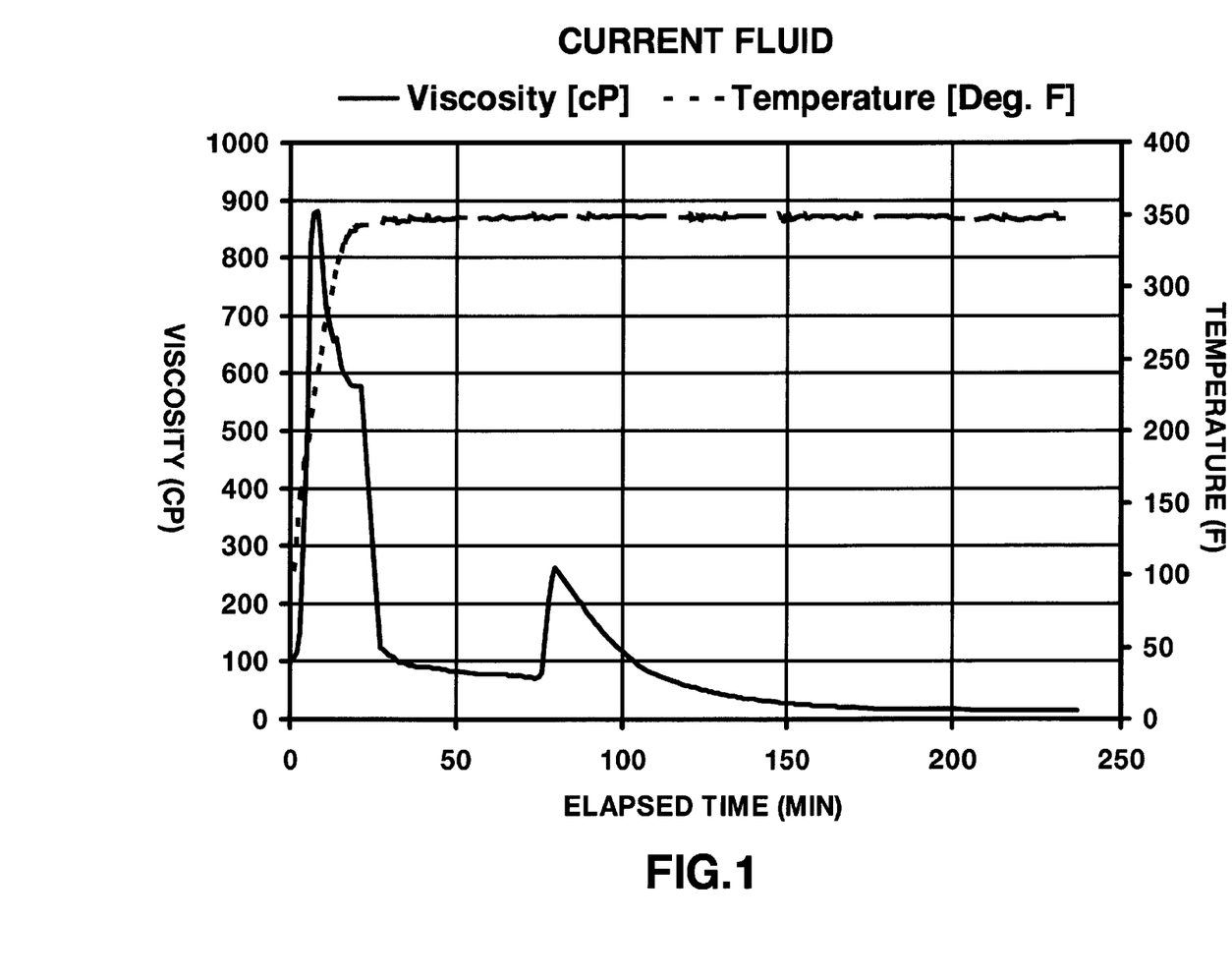
FIG. 1 is a graph of the change in viscosity over time of a fluid that was heated to about 350° F.

The fluids contained various combinations of tetraethylenepentamine (TEPA) with other materials, and were aged at 325° F. for 2 or 5 hours. The results are shown in Table 2 below.

prised 20 wt % isopropanol, 20 wt % 2-butoxyethanol (EGMBE), 20 wt % ethoxylated $C_{11}$ linear/branched alcohols, 10 wt % ethoxylated $C_{12}$–$C_{15}$ linear alcohols in water referred to hereafter as "surfactant mixture 1"); and 5 gpt of 85 wt % aqueous triethanolamine.

Figure 2:
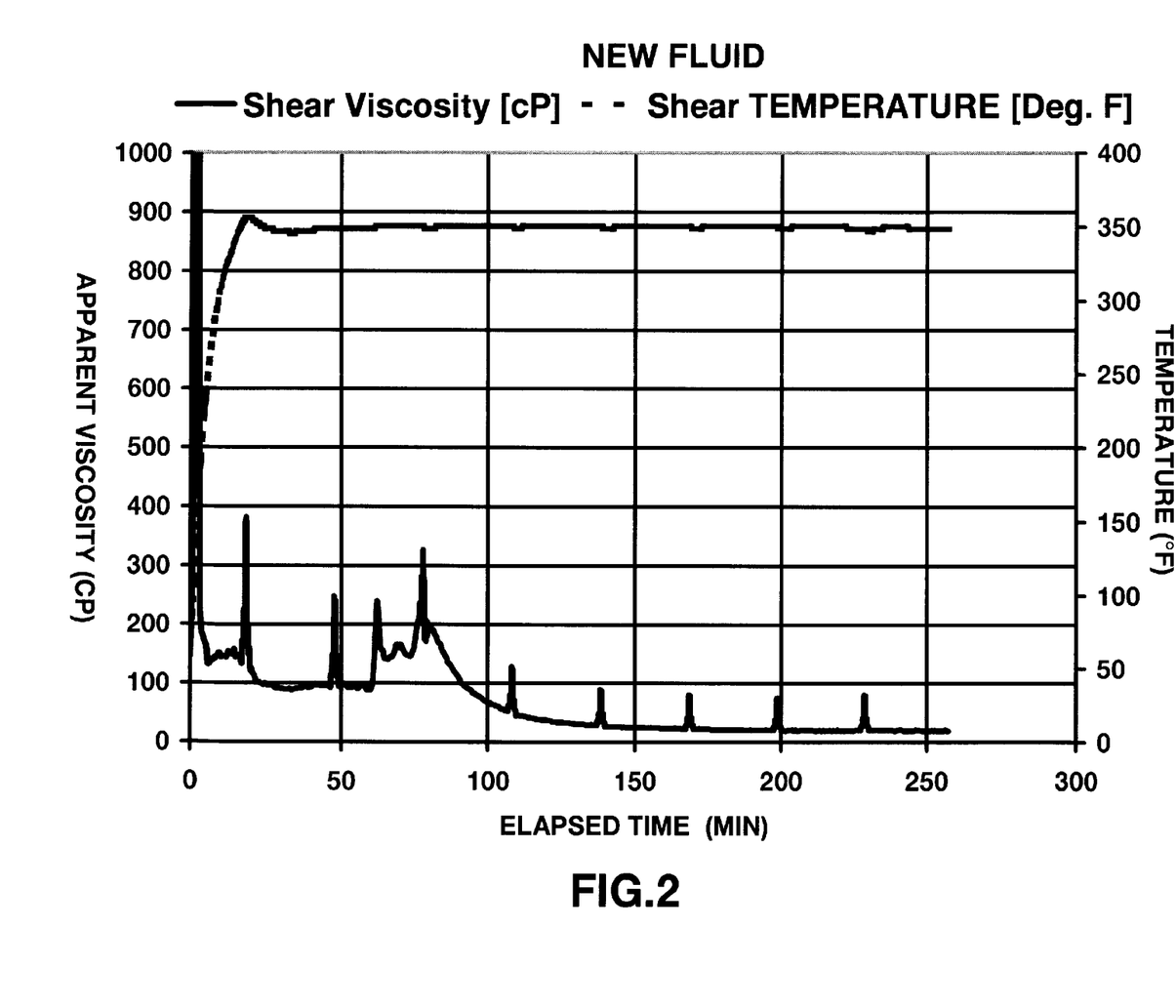
FIG. 2 is a graph of the change in viscosity over time of a fluid of the present invention that was heated to about 350° F.

FIG. 2 shows the viscosity change of another fluid, which contained tetraethylenepentamine (TEPA) as a stabilizer, and was cross-linked with an organic zirconate. This fluid comprised a slurry of 51 wt % CMHPG/49% diesel, 2% KCl, 1 gpt bis(hydroxyethyl)glycine zirconate, 1 gpt of aqueous sodium acetate/acetic acid mixture (pH 5.5–6.0), 1 gpt of bactericide 1, and 5 gpt TEPA. The apparent drops in viscosity for about 45 minutes after the fluids reach the elevated temperature are believed to be due to "bob climb" commonly seen with viscous zirconates in this viscometer geometry. The fluid recovered from the test of FIG. 1 was brown, while the fluid recovered from the test of FIG. 2 was yellow.

The fluid containing TEPA and bis(hydroxyethyl)glycine zirconate (FIG. 2) at ambient temperature quickly reached a viscosity sufficient to transport proppant (40–120 cP), but did not crosslink further, even after 10 minutes, until it was heated.

Figure 3:
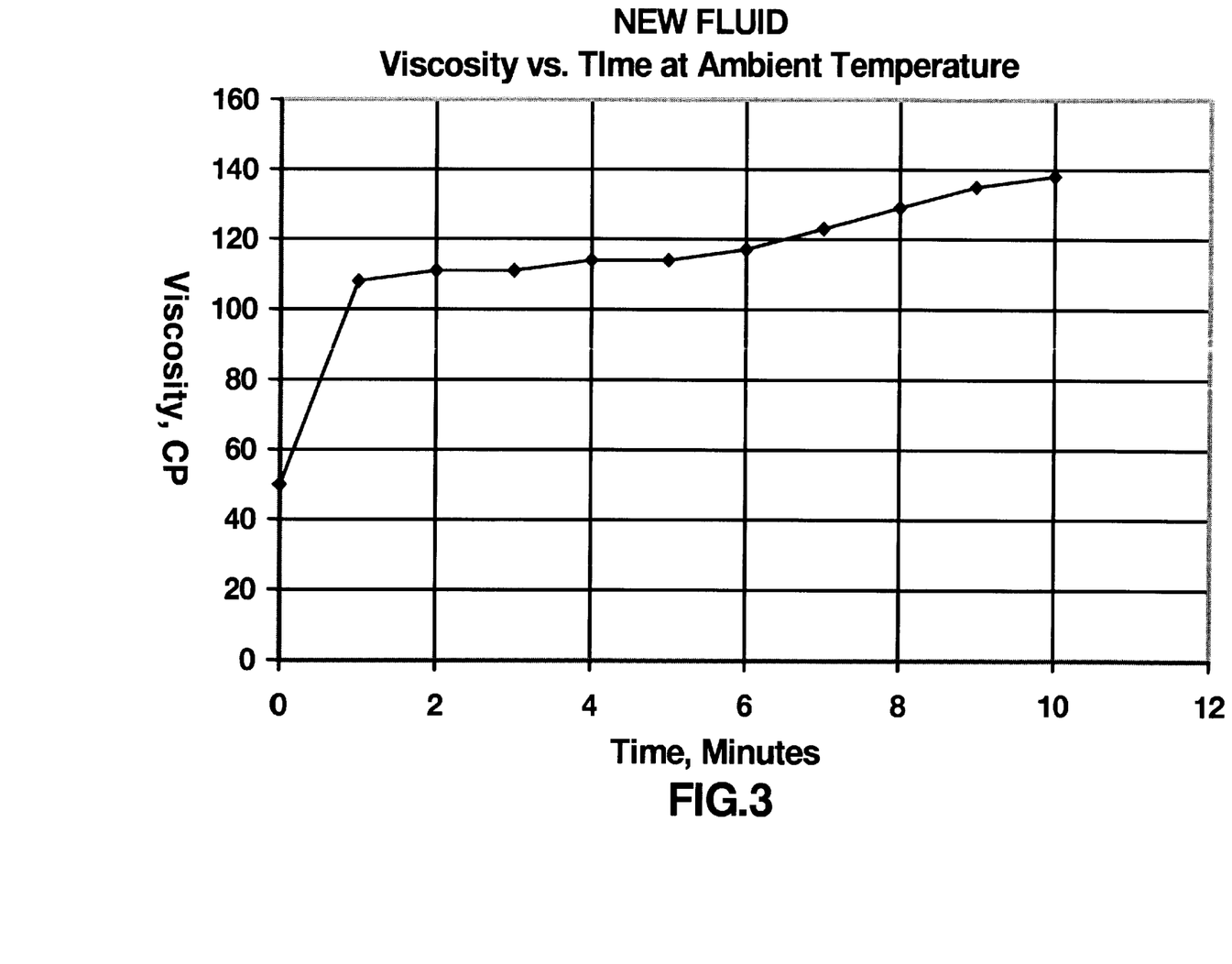
FIG. 3 is a graph of the change in viscosity over time of a fluid of the present invention at ambient temperature.
Figure 4:
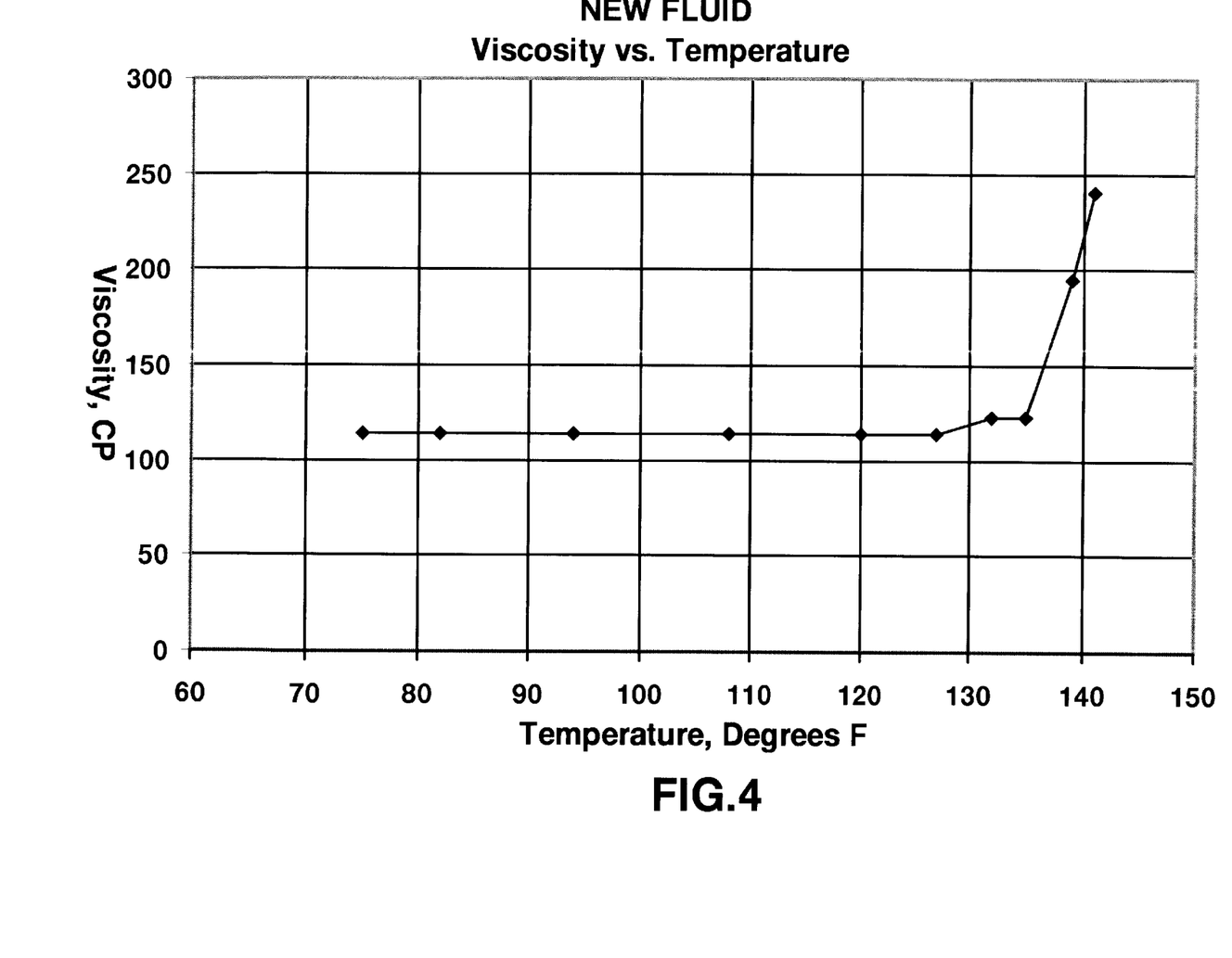
FIG. 4 is a graph of the change in viscosity as a function of temperature for a fluid of the present invention.

FIG. 3 shows the change in viscosity over time at ambient temperature of the same fluid described above with respect to FIG. 2, which comprised 1 gpt bis(hydroxyethyl)glycine zirconate and 5 gpt TEPA. FIG. 4 shows viscosity change, as measured on a Fann 35 viscometer, of a portion of the same fluid from FIG. 3 that was heated above ambient temperature. The true crosslink temperature was about 140° F.

Table 3 below shows data from measurements of additional fluids, made with a Fann 50 viscometer at 100 sec$^{-1}$.

TABLE 2

| Concentration TEPA (gpt) | Secondary additive | Concentration secondary additive | % of initial viscosity after 2 hrs. | % of initial viscosity after 5 hrs. | Comments |
|---|---|---|---|---|---|
| 5 | — | — | 93 | — | pH 11.50 |
| 1 | NaOH | 2% | 63 | — | pH 11.52 |
| 2 | NaOH | 2% | 78 | — | pH 11.51 |
| 3 | NaOH | 2% | 90 | — | pH 11.53 |
| 5 | — | — | 63 | 25 | |
| 5 | MeOH | 2 gpt | 74 | 19 | |
| 5 | MeOH | 5 gpt | 69 | 8 | |
| 5 | MeOH | 10 gpt | — | 6 | |
| 5 | — | — | — | 76 | |
| 5 | Na bicarbonate | 2 ppt | — | 63 | |
| 5 | Na bicarbonate | 5 ppt | — | 65 | |
| 5 | Na bicarbonate | 10 ppt | — | 66 | |
| 5 | Na bicarbonate | 20 ppt | — | 60 | |
| 5 | — | — | — | 25 | |
| 5 | Na thiosulfate | 10 ppt | — | 8 | |
| 5 | Na thiosulfate | 20 ppt | — | 7 | |
| 5 | Na thiosulfate | 40 ppt | — | 2 | |

EXAMPLE 2

Changes in the viscosity of fluids as a function of time at elevated temperatures were measured with a Fann 50 viscometer. FIG. 1 shows the viscosity change of a fluid that was heated to 350° F. This fluid comprised 11.3 gpt of a slurry of 51 wt % CMHPG/49% diesel; 2% KCl; 1 gpt an aqueous organo-zirconium complex (available as ZXL-750 from Benchmark Research and Technology, Midland, Tex.); 8.5 gpt of 6.7% aqueous sodium hydroxide; 1 gpt of aqueous sodium acetate/acetic acid mixture (pH 5.5–6.0); 10 ppt sodium thiosulfate; 1 gpt of a surfactant mixture that com- The fluids in this test were heated to 350° F. and viscosity was measured at various times. All of the fluids were prepared in deionized water with 11.3 gpt of a slurry of 51 wt % CMHPG/49% diesel; 1 gpt of aqueous sodium acetate/ acetic acid mixture (pH 5.5–6.0) as a buffer; and 167 ppt potassium chloride as a clay stabilizer. Other components of the fluid, as well as the experimental results, are summarized in Table 3. The crosslink temperatures were determined visually. The last four columns in the table show the viscosity at 100 sec$^{-1}$ at 2, 100, and 240 minutes, and the time in minutes for the viscosity to decrease to 100 cP.

TABLE 3

| Run Number | Cross-link Temp. (° F.) | Acid or Base (gpt) | Cross-linker | Na bicar-bonate (ppt) | Na thio-sulfate (ppt) | Addi-tive (1 gpt) | Trieth-anol-amine (1) | TEPA (gpt) | Cross-link pH/ final pH | cP @ 2 min | cP @ 100 min | cP @ 240 min | min @ 100 cP |
|---|---|---|---|---|---|---|---|---|---|---|---|---|---|
| 2-1 | 80 | | 1.0 gpt Zr bicine (2) | | | bacteri-cide 1 | | 5 gpt | 10.82 10.31 | >1,000 | 76 | 20 | 96 |
| 2-2 | 113 | 8.5 gpt 6.7% NaOH | 1 gpt ZXL-750 (3) | 12 ppt | 30 ppt | surf. mixture 2 (4) | 1 gpt | | 9.52 9.19 | >1,000 | 100 | 1 | 100 |
| 2-3 | 79 | | 1.0 gpt Zr bicine | | | bacteri-cide 1 | | 5 gpt | 10.82 10.28 | >1,000 | 100 | 14 | 100 |
| 2-4 | 138 | | 1.0 gpt Zr bicine | | | bacteri-cide 1 | | 1 gpt | 10.02 9.24 | >1,000 | 10 | 9 | 37 |
| 2-5 | 92 | | 1.0 gpt Zr bicine | | | bacteri-cide 1 | | 10 gpt | 11.12 11.03 | >1,000 | 56 | 2 | 65 |
| 2-6 | 123 | 38 gpt 10% HCl | 1 gpt ZXL-750 | 12 ppt | 30 ppt | surf. mixture 2 | 1 gpt | 5 gpt | 8.08 8 | 235 | 1 | 1 | 17 |
| 2-7 | 158 | 8.5 gpt 6.7% NaOH | 1 gpt ZXL-750 | 12 ppt | 10 ppt | surf. mixture 1 | | 5 gpt | 9.34 9.18 | >1,000 | 119 | 15 | 103 |
| 2-8 | 139 | 11.7 gpt 10% HCl | 1 gpt ZXL-750 | 12 ppt | 30 ppt | surf. mixture 2 | 1 gpt | 5 gpt | 9.43 9.12 | 820 | 5 | 3 | 40 |
| 2-9 | 104 | | 1.0 gpt Zr bicine | | 10 ppt | bacteri-cide 1 | 1 gpt | 5 gpt | 10.83 10.29 | >1,000 | 90 | 1 | 98 |
| 2-10 | 165 | 8.5 gpt 6.7% NaOH | 1 gpt ZXL-750 | 12 ppt | 30 ppt | surf. mixture 2 | 1 gpt | | 8.90 8.73 | 575 | 330 | 120 | >240 |
| 2-11 | 124 | | 1.0 gpt Zr bicine | | | bacteri-cide 1 | | 5 gpt | 10.86 10.31 | >1,000 | 129 | 204 | >240 |

EXAMPLE 3

Viscosity measurements similar to those described in Example 2 above were made on fluids containing various organic amines. Each of these fluids, which were all heated to 350° F., comprised 50 ppt of CMHPG as the polymer; 167 ppt of potassium chloride as a clay stabilizer; 1.25 gpt of bis(hydroxyethyl)glycine zirconate as a crosslinker, 12 ppt of sodium bicarbonate; 1 gpt of surfactant mixture 1; and 2 ppt of 85 wt % aqueous triethanolamine. The CMHPG was part of a slurry of 51 wt % CMHPG/49% diesel, dispersed and hydrated with 2 gpt (in most runs) of aqueous sodium acetate/acetic acid mixture (pH 5.5–6.0). (The amount of the sodium acetate/acetic acid solution used was 1 gpt in runs 3–8 and 3–9, and 2.16 gpt in run 3–11.) Viscosity was measured on a Fann 50 viscometer at 100 sec$^{-1}$ after 2, 100, and 240 minutes of heating. Table 4 below summarizes the other components used in the fluids and the data.

TABLE 4

| Run Number | Crosslink Temp. (° F.) | NaOH (30% aqueous) (gpt) | Na thio-sulfate (ppt) | Additive | Initial pH/ crosslink pH | cP @ 2 min | cP @ 100 min | cP @ 240 min | min @ 100 cP | Bob climb (min) |
|---|---|---|---|---|---|---|---|---|---|---|
| 3-1 | 126 | 1.7 | | | 10.72 10.87 | 1,000 | 20 | — | 7 | 0 |
| 3-2 | 139 | 1.54 | 25 | | 10.84 — | 1,000 | 40 | 8 | 5 | 0 |
| 3-3 | 149 | 1.3 | | 5 gpt TEPA | 10.60 — | 1,000 | 55 | 26 | 185 | 110 |
| 3-4 | 139 | | 25 | 5 gpt TEPA | 10.32 10.17 | 1,000 | 85 | 14 | 130 | 120 |
| 3-5 | 138 | | 25 | 5 gpt TEPA | 10.37 10.30 | 1,000 | 120 | 80 | 235 | 185 |
| 3-6 | 141 | 1.02 | 25 | 4 gpt DETA | 10.79 — | 1,000 | 75 | 25 | 43 | 0 |
| 3-7 | 139 | 0.84 | | 4 gpt DETA | 10.64 — | 1,000 | 100 | 60 | 207 | 120 |
| 3-8 | | 1.6 | 25 | 4 gpt ADD | 10.59 9.67 | 1,000 | 56 | — | >140 | 120 |

TABLE 4-continued

| Run Number | Crosslink Temp. (° F.) | NaOH (30% aqueous) (gpt) | Na thio-sulfate (ppt) | Additive | Initial pH/ crosslink pH | cP @ 2 min | cP @ 100 min | cP @ 240 min | min @ 100 cP | Bob climb (min) |
|---|---|---|---|---|---|---|---|---|---|---|
| 3-9 | | 1.62 | | 4 gpt ADD | 10.62 9.93 | 1,000 | 30 | — | 34 | 0 |
| 3-10 | 100 | 0.72 | 25 | 4 gpt BAPED | 10.72 — | 1,000 | 45 | — | 25 | 0 |
| 3-11 | 152 | | | 4 gpt BAPED | 10.77 10.26 | 1,000 | 35 | — | 47 | 0 |
| 3-12 | 137 | 1.02 | 25 | 4 gpt NDPA-10 | 10.62 — | 1,000 | 65 | 27 | 48 | 10 |
| 3-13 | 144 | 0.96 | | 4 gpt NDPA-10 | 10.85 10.55 | 1,000 | 45 | — | 15 | 0 |
| 3-14 | 141 | 1.22 | 25 | 4 gpt DPA-12 | 10.69 10.61 | 1,000 | 55 | 62 | — | 0 |
| 3-15 | 133 | 1.18 | | 4 gpt DPA-12 | 10.65 10.62 | 1,000 | 70 | — | 5 | 0 |
| 3-16 | 125 | 0.72 | 25 | 4 gpt NDPA-12 | 10.54 — | 1,000 | 60 | 34 | 20 | 0 |
| 3-17 | 144 | 0.88 | | 4 gpt NDPA-12 | 10.71 — | 1,000 | 15 | — | 15 | 0 |
| 3-18 | 145 | 0.78 | 25 | 5 gpt TAA | 10.80 — | 1,000 | 105 | 65 | 102 | 0 |
| 3-19 | 158 | 1.74 | 25 | 5 gpt DHA | 10.62 10.97 | 1,000 | — | — | 19 | 0 |
| 3-20 | 169 | 1.28 | 25 | 5 gpt DDA | 10.40 10.79 | 1,000 | 80 | 35 | 10 | 0 |
| 3-21 | | 3.4 | 25 | 5 gpt Duomeen T | 10.81 10.05 | 790 | 40 | — | 12 | 0 |

(The additive abbreviations used in TABLE 4 have the same meaning as defined in the previous examples.)

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A method of hydraulically fracturing a subterranean formation, comprising the step of:
   injecting a well treatment fluid composition via a wellbore into a subterranean formation at a flow rate and pressure sufficient to produce or extend a fracture in the formation, wherein the well treatment fluid composition comprises:
   a carrier fluid;
   a solvatable, crosslinkable polymer;
   a cross-linking agent that does not cause substantial cross-linking of the polymer at temperatures less than about 105° F. and a pH of about 10 or greater; and
   an organic amine stabilizing agent that has a first $pK_a$ or a pH in water of at least about 9.5.

2. The method of claim 1, wherein the cross-linking agent is an organic zirconate.

3. The method of claim 2, wherein the organic zirconate cross-linking agent is effective to cross-link the polymer at a pH of about 10 or higher and a temperature of at least about 105° F.

4. The method of claim 3, wherein the organic zirconate cross-linking agent is effective to cross-link the polymer at a pH in the range of about 10.5–12 and a temperature of at least about 105° F.

5. The method of claim 1, wherein the cross-linking agent comprises bis(hydroxyethyl)glycine zirconate.

6. The method of claim 1, wherein the organic amine has from 1–20 carbon atoms.

7. The method of claim 1, wherein the organic amine has the formula $$H_2N-(R_1NH)_n-H$$

where $R_1$ is $C_1$–$C_4$ alkyl and n is from 1–6.

8. The method of claim 7, wherein $R_1$ is ethylene.

9. The method of claim 8, wherein the stabilizing agent comprises tetraethylenepentamine.

10. The method of claim 1, wherein the polymer is selected from the group consisting of guar, hydroxypropyl guar, carboxymethyl guar, carboxymethylhydroxypropyl guar, hydroxyethyl cellulose, carboxymethylhydroxyethyl cellulose, hydroxypropyl cellulose, xanthan, and mixtures thereof.

11. The method of claim 1, wherein the fluid further comprises a proppant.

12. The method of claim 1, wherein the fluid further comprises a delay agent.

13. The method of claim 12, wherein the delay agent is a bicarbonate salt.

14. The method of claim 1, wherein the fluid further comprises a viscosity breaker agent.

15. The method of claim 1, wherein the fluid further comprises at least one additive selected from the group consisting of scale inhibitors, surfactants, biocides, and breaker aids.

16. A method of hydraulically fracturing a subterranean formation, comprising the step of:
   injecting a well treatment fluid composition via a wellbore into a subterranean formation at a flow rate and pressure sufficient to produce or extend a fracture in the formation, wherein the well treatment fluid composition comprises:

a carrier fluid;

a solvatable, crosslinkable polymer selected from the group consisting of guar, hydroxypropyl guar, carboxymethyl guar, carboxymetylhydroxypropyl guar, hydroxyethyl cellulose, carboxymethylhydroxyethyl cellulose, hydroxypropyl cellulose, xanthan, and mixtures thereof;

a cross-linking agent that comprises bis(hydroxyethyl) glycine zirconate;

an organic amine stabilizing agent that comprises tetraethylenepentamine; and a delay agent that comprises a bicarbonate salt.

17. The method of claim 16, wherein the fluid further comprises a viscosity breaker agent.

* * * * *